United States Patent
Imada et al.

(10) Patent No.: US 8,443,364 B2
(45) Date of Patent: *May 14, 2013

(54) VIRTUAL MACHINE SYSTEM AND VIRTUAL MACHINE CONTROL METHOD

(75) Inventors: Toyohisa Imada, Isehara (JP); Takashi Shimojo, Hadano (JP); Makiko Shinohara, Hadano (JP); Yoshihiro Harima, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/748,543

(22) Filed: Mar. 29, 2010

(65) Prior Publication Data

US 2010/0186012 A1    Jul. 22, 2010

Related U.S. Application Data

(63) Continuation of application No. 11/705,059, filed on Feb. 12, 2007, now Pat. No. 7,721,285, which is a continuation of application No. 10/124,399, filed on Apr. 18, 2002, now Pat. No. 7,272,799.

(30) Foreign Application Priority Data

Apr. 19, 2001  (JP) ................................. 2001-120468

(51) Int. Cl.
G06F 9/455   (2006.01)
G06F 3/048   (2006.01)

(52) U.S. Cl.
USPC ............................................. 718/1; 715/767

(58) Field of Classification Search .......................... None
See application file for complete search history.

(56) References Cited

U.S. PATENT DOCUMENTS

| | | | |
|---|---|---|---|
| 4,660,144 A | 4/1987 | Walsh | |
| 4,747,040 A | 5/1988 | Blanset et al. | |
| 4,787,031 A | 11/1988 | Karger et al. | |
| 4,949,254 A | 8/1990 | Shorter | |
| 5,479,643 A | 12/1995 | Bhaskar et al. | |
| 5,506,975 A | 4/1996 | Onodera | |
| 5,621,912 A * | 4/1997 | Borruso et al. | 718/1 |
| 6,097,385 A | 8/2000 | Robinson | |
| 6,456,893 B1 | 9/2002 | Nakanishi | |
| 6,922,774 B2 | 7/2005 | Meushaw et al. | |
| 7,146,602 B2 * | 12/2006 | Frerking et al. | 717/118 |
| 7,516,453 B1 * | 4/2009 | Bugnion | 718/1 |

FOREIGN PATENT DOCUMENTS

| | | |
|---|---|---|
| JP | 01-214955 | 8/1989 |
| JP | 06-250858 | 9/1994 |
| JP | 08-249154 | 9/1996 |
| JP | 11-259316 | 9/1999 |
| JP | 2001-092622 | 4/2001 |
| WO | WO 00/70449 | 11/2000 |

* cited by examiner

*Primary Examiner* — Camquy Truong
(74) *Attorney, Agent, or Firm* — Brundidge & Stanger, P.C.

(57) ABSTRACT

A user interface function for a virtual machine system based on a server or a PC is provided only by applying software without using SVP or the like. A control virtual machine is provided for controlling a virtual machine control screen which is displayed for defining virtual machines and instructing operations to the virtual machines. A virtual machine control program exclusively displays either a screen for each virtual machine or the virtual machine control screen in response to a screen switching instruction from an input device.

2 Claims, 7 Drawing Sheets

LPAR Control

| LPS | LPNAME | ST | RAM | BOOT | SRV | PROC | MODE | IRQ 00000000000 0 0 0 0 0 1 1 1 1 1 1 1 1 0123456789ABCDEF01234567 |
|-----|--------|----|-----|------|-----|------|------|------|
| 1 | LPAR-A | A | 1024 | 81 | 70 | | SHR | XX |
| 2 | LPAR-B | D | 512 | 82 | | 1 | DED | X |
| 3 | LPAR-C | A | 256 | 83 | 30 | | SHR | X |
| 4 | | U | | | | | | |

Command [                                              ]

| MANIPULATION AND CPU OPERATION | CONSOLE DISPLAY SCREEN |
|---|---|
| (1) EXECUTE LPAR2 (OS2)<br>(2) KEY MANIPULATION FOR SWITCHING LPAR DISPLAYED ON SCREEN<br>(3) ACCEPT INTERRUPT RESULTING FROM KEY MANIPULATION (CONTROL IS TRANSFERRED FROM OS2 TO HYPERVISOR)<br>(4) SAVE INTERRUPT INFORMATION OF CURRENTLY RUNNING OS2<br>(5) RECOGNIZE KEY MANIPULATION AS SCREEN SWITCHING EVENT<br>(6) UPDATE SCREEN-OWNING LPAR INFORMATION TO OS2<br>(7) CHANGE SCREEN BUFFER OF OS2 TO CONSOLE OUTPUT (CHANGE CONSOLE OUTPUT OF OS1 TO SCREEN BUFFER)<br>(8) RECOVER SAVED INTERRUPT INFORMATION IN HYPERVISOR (CONTROL IS TRANSFERRED FROM HYPERVISOR TO OS2)<br>(9) EXECUTE LPAR2 (OS2) | DISPLAY LPAR1 (OS1)<br><br><br><br><br><br>SWITCH TO LPAR2 (OS2) |

VIRTUAL MACHINE SYSTEM AND VIRTUAL MACHINE CONTROL METHOD

CROSS-REFERENCE TO RELATED APPLICATION

This application is a continuation of U.S. patent application Ser. No. 11/705,059, filed Feb. 12, 2007, now U.S. Pat. No. 7,721,285, which is a continuation of Ser. No. 10/124,399, filed Apr. 18, 2002, now U.S. Pat. No. 7,272,799, the entirety of which are incorporated herein by reference.

This application relates to an application U.S. Ser. No. 09/228,296, now U.S. Pat. No. 6,408,393 filed on Jan. 8, 1999 entitled "CPU POWER ADJUSTMENT METHOD" by Toyohisa Imada et al. and assigned to the present assignee. The disclosure of that application is incorporated herein by reference.

BACKGROUND OF THE INVENTION

The present invention relates to a virtual machine system, and more particularly, to a user interface for a virtual machine system based on a server or a personal computer (PC).

A large scaled computer has a service processor (SVP) dedicated to maintenance operations for a system. The SVP is provided with a console display device for use by the user to input and output data. A conventional virtual machine system based on a large scaled computer is controlled by the user who defines virtual machines on a console display device associated with an SVP and specifies the proportion of the performance among the respective virtual machines, resources such as processing units for use by the virtual machines, and so on. An SVP-based user interface for a virtual machine system is described, for example, in JP-A-6-250858.

SUMMARY OF THE INVENTION

For implementing a virtual machine system on a server or a PC, the server or PC should be provided with a user interface equivalent to that for use with a virtual machine system on a large scaled computer. However, it is difficult to add the SVP as provided in a large scaled computer to the server or PC.

It is an object of the present invention to provide a user interface function for virtual machine systems based on a server and a PC without using the SVP or the like.

One aspect of the present invention provides a virtual machine system implemented on a physical machine having a display device, wherein a plurality of virtual machines are controlled by a virtual machine control program. The virtual machine system includes a control virtual machine for a user to control the virtual machines, and one or two or more of user defined virtual machines controlled by the user through the control virtual machine.

Another aspect of the present invention also provides a virtual machine control method for use in a virtual machine system wherein one or two or more virtual machines are controlled by a virtual machine control program. The virtual machine control program recognizes a screen switching instruction from an input device, and exclusively displays either a screen corresponding to each virtual machine or a control screen for controlling each virtual machine on the same display device in accordance with the instruction.

A further aspect of the present invention further provides a program for controlling one or two or more virtual machine running on a physical machine, wherein the program causes the physical machine to execute the steps of recognizing a screen switching instruction from an input device, and exclusively displaying a screen corresponding to each virtual machine or a control screen for controlling each virtual machine on the same display device in accordance with the instruction.

Another aspect of the present invention further provides a computer readable recording medium having recorded thereon a program for controlling one or two or more virtual machine running on a physical machine, wherein the program causing the physical machine to execute the steps of recognizing a screen switching instruction from an input device, and exclusively displaying a screen corresponding to each virtual machine or a control screen for controlling each virtual machine on the same display device in accordance with the instruction.

Other objects, features and advantages of the invention will become apparent from the following description of the embodiments of the invention taken in conjunction with the accompanying drawings.

DETAILED DESCRIPTION OF THE EMBODIMENTS

In the following, one embodiment of the present invention will be described in detail with reference to the drawings.

Figure 1:
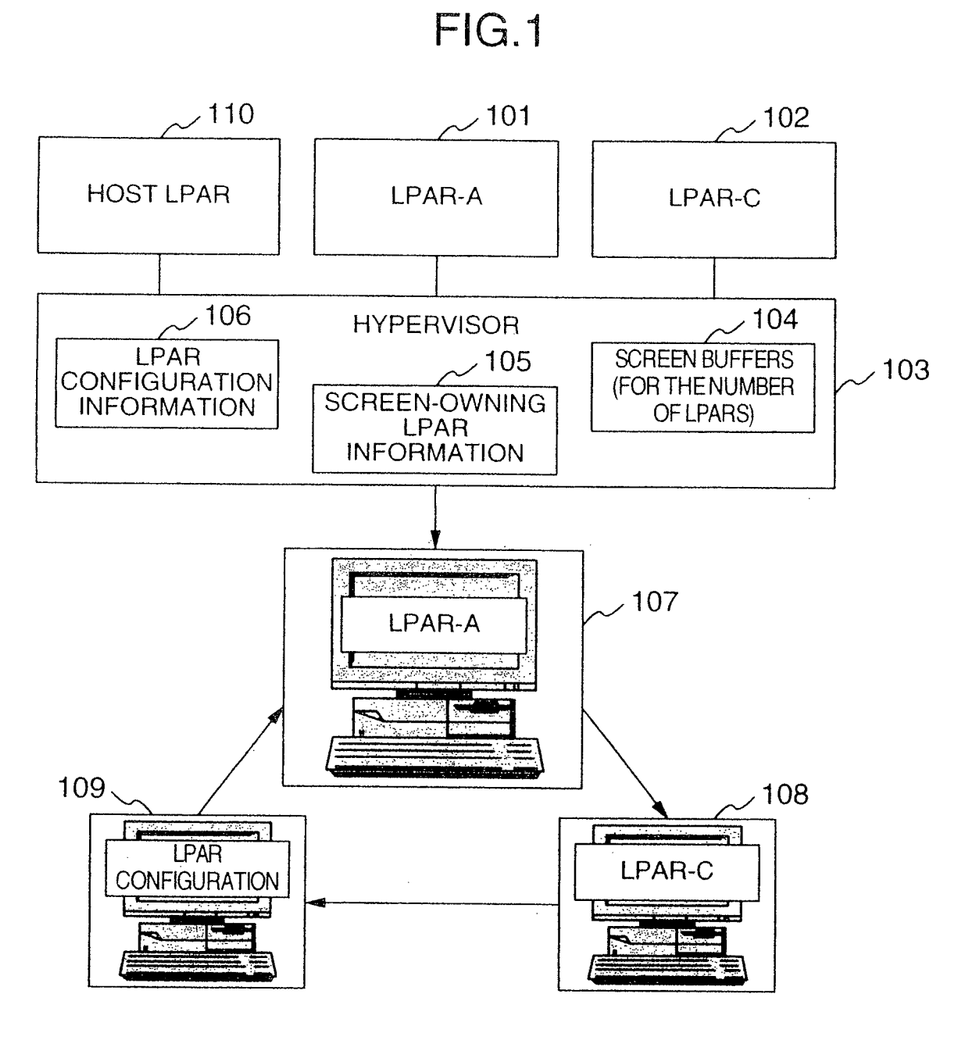
FIG. 1 is a block diagram illustrating the configuration of a virtual machine system according to one embodiment of the present invention, and showing how a screen is switched on a display device of the system.

FIG. 1 illustrates a virtual machine system (hereinafter called "PC-LPAR") on a server or a PC according to one embodiment of the present invention, and shows how a screen is switched on a display of the system. PC-LPAR controls a plurality of virtual machines (hereinafter called "LPAR") by means of a virtual machine control program (hereinafter called "HYPERVISOR") for providing a plurality of logical platforms.

FIG. 1 shows that LPAR-A 101 and LPAR-C 102 are running as virtual machines for providing logical platforms, and a screen corresponding to LPAR-A 101 is displayed (display 107). In this event, screen data, not displayed on the screen, of LPAR-C 102 which is running simultaneously is stored in a screen buffer 104 which is provided for each LPAR in HYPERVISOR 103. The screen data of LPAR currently displayed on the screen (hereinafter, such LPAR is called the "screen-owning LPAR") is not stored in the screen buffer 104, but is displayed after HYPERVISOR 103 simulates a screen input/output instruction.

For switching a screen to another LPAR (for example, to LPAR-C), a special key is entered from a keyboard. Upon recognition of a switching operation, HYPERVISOR 103 updates screen-owning LPAR information 105 to LPAR-C 102 which is to display the next time, and displays the screen of LPAR-C from a screen buffer of LPAR-C (display 108). From then on, the screen data of LPAR-A 101 is stored in the screen buffer 104.

Similarly, a switching operation is performed from the keyboard to update the screen-owning LPAR information 105 to LPAR which is to be displayed the next time. In this embodiment, the screen-owning LPAR information 105 is switched to a host LPAR 110 which displays LPAR configuration information 106. The host LPAR 110 extracts the defined LPAR configuration information 106 from within HYPERVISOR 103 or from an external medium (in this embodiment, from within the HYPERVISOR 103), and displays its contents (display 109). Details on the display contents will be described in connection with FIG. 2.

Figure 2:
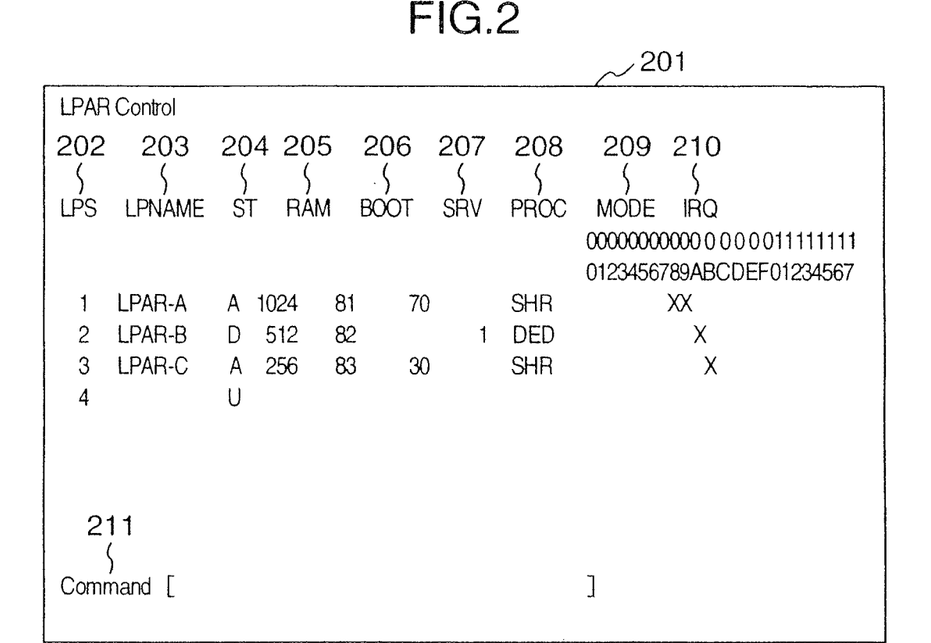
FIG. 2 shows an LPAR control screen according to the embodiment of the present invention.

FIG. 2 shows an LPAR control screen 201 for displaying LPAR configuration information which defines each virtual machine. Specifically, FIG. 2 shows that three LPARs are defined, and two LPARs out of them are running.

LP #202 designates a number for identifying LPAR (LPAR number). The system can define LPARs up to a maximum LPAR number which is displayed on the screen, and can also execute these LPARs. LPNAME 203 designates the name of LPAR corresponding to an LPAR number. The LPAR name can be freely set by the user. ST 204 indicates the current status of each LPAR, where A represents that the associated LPAR is active; D represents that it is inactive; and U represents that it is not defined. RAM 205 specifies a memory capacity (in MB in this embodiment) allocated to each LPAR. BOOT 206 specifies an identification of a device including operating software (OS) which functions as a platform of the associated LPAR. SRV 207 specifies a relative performance ratio in which a processor resource in the system is serviced to associated LPAR. MODE 209 specifies whether the processor resource allocated to the associated LPAR is shared (SHR) by respective LPARs or dedicated (DED) to the LPAR. PROC 208 specifies the number of dedicated processors when MODE 209 is specified as DED. IRQ 210 specifies an identifier of a PCI device which is used exclusively by each LPAR. Command 211 indicates a command input area for issuing operation instructions to each LPAR.

Figure 3:
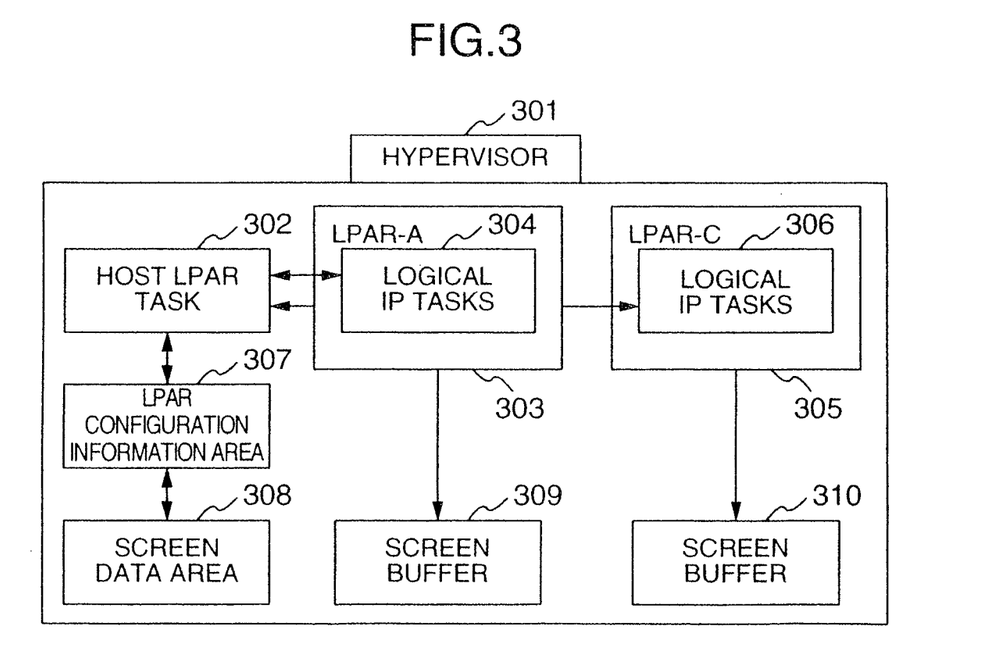
FIG. 3 is a block diagram generally illustrating the internal configuration of HYPERVISOR according to the embodiment of the present invention.

FIG. 3 generally illustrates an example of the internal configuration of HYPERVISOR shown, in FIG. 1, where special attention is paid to screen data. HYPERVISOR 301 is made up of such tasks as a host LPAR task 302, and logical IP tasks 304, 306 which run on LPARs 303, 305, respectively. This embodiment shows that two LPARs are running.

The host LPAR task 302 manages configuration information and the like for each LPAR, and controls the display of the configuration information on the screen which should be instructed and set by the user. When the screen-owning LPAR is the host LPAR, display data is retrieved from an LPAR configuration information area 307, and screen data is created in a screen data area 308 for display on the screen.

Each of the logical IP tasks governs the operation of LPAR associated therewith, and simulates instructions which cannot be directly executed by a processor. All instructions related to screen processing are processed under control of HYPERVISOR.

If associated LPAR is the screen-owning LPAR, this LPAR is displayed on the screen by a simulation of instructions. Otherwise, screen data of LPAR is written into previously provided screen buffers 309, 310 of each LPAR, and the control is returned to this LPAR. The screen-owning LPAR has a control right for a keyboard and a mouse, and HYPERVISOR simulates instructions related to interrupts to the keyboard and mouse, and returns the control to the screen-owning LPAR.

The host LPAR task 302 executes in accordance with operations on the LPAR control screen 201, and also issues operation requests to the respective IP tasks 304, 306 of associated LPAR.

Figure 4:
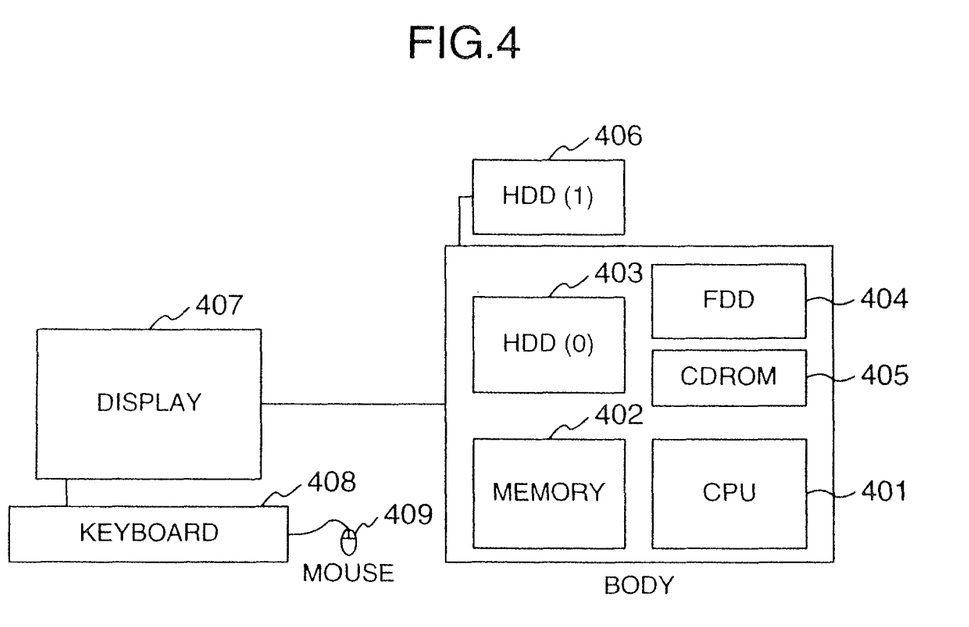
FIG. 4 is a block diagram illustrating the configuration of a virtual machine system according to the embodiment of the present invention.

FIG. 4 illustrates the configuration of the virtual machine system in this embodiment. Similar to a normal PC or the like, the illustrated system comprises a CPU 401, a memory 402, a hard disk drive (HDD) (0) 403, a floppy disk drive (FDD) 404, a CD-ROM 405, and the like. In addition, each LPAR is provided with an HDD (1) 406 for storing an OS for booting the LPAR. The CPU 401 is comprised of one or a plurality of processors. Among components which form part of the system, the memory 402 and CPU 401 are shared by the respective LPARs, while I/O devices such as a screen 407, a keyboard 408, a mouse 409 and the like are independently assigned to and controlled by each LPAR in accordance with instructions.

Figure 5:
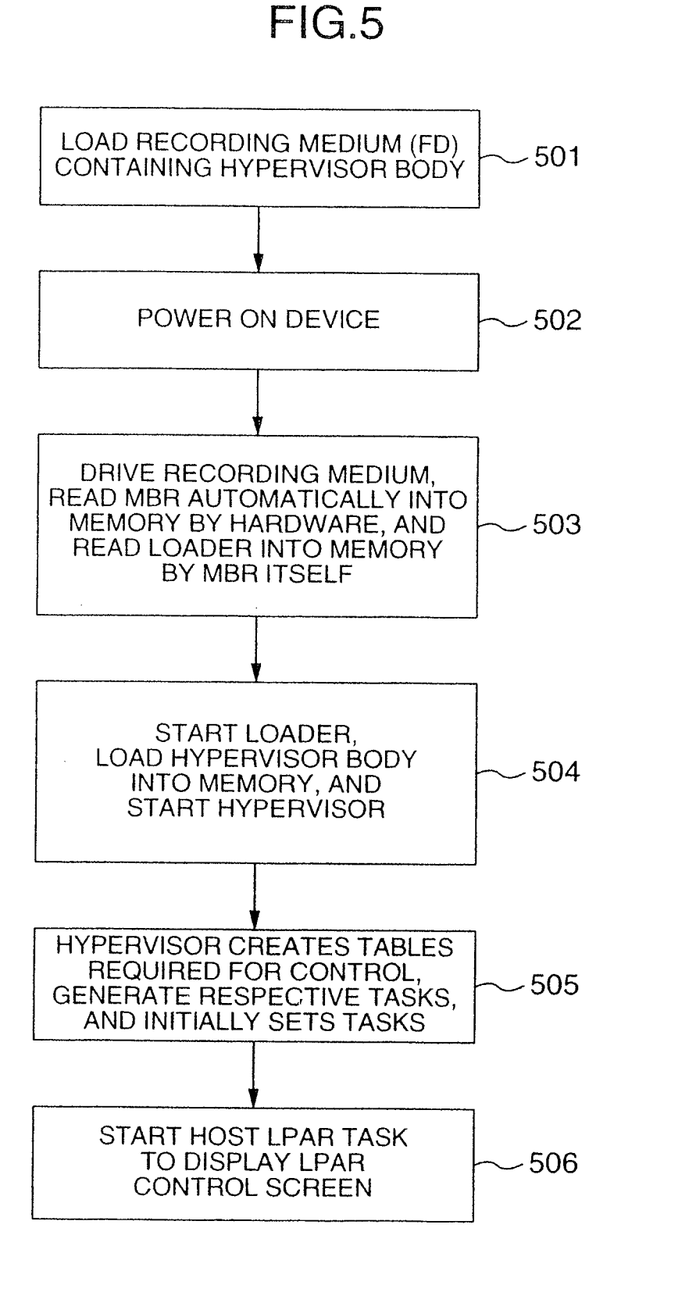
FIG. 5 is a flow diagram illustrating a booting and initialization flow of HYPERVISOR according to the embodiment of the present invention.
Figure 6:
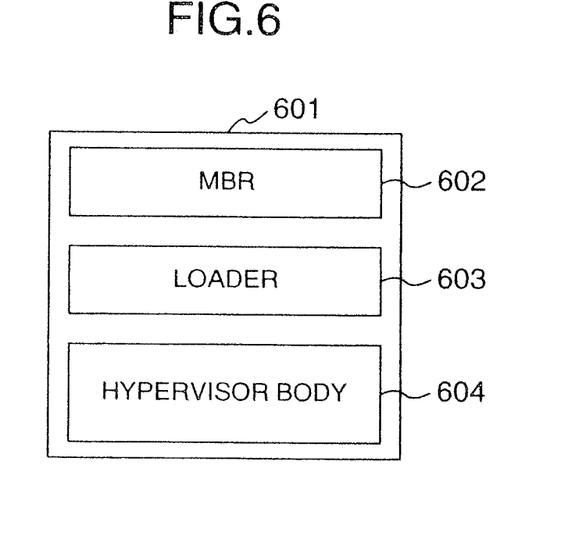
FIG. 6 shows contents of a recording medium which stores HYPERVISOR according to the embodiment of the present invention.

FIG. 5 illustrates a processing flow of booting and initialization of HYPERVISOR. When the system is launched as PC-LPAR, a HYPERVISOR body 604 including a loader 603 has been previously stored on a recording medium (FD or the like) 601 shown in FIG. 6. The recording medium 601 is loaded into a system device (step 501), and the system device is powered on (step 502). As the system device is powered on, the recording medium 601 is driven so that a master boot record (MBR) 602 on the recording medium 601 is automatically read into the memory 402 by hardware, and the MBR 602 itself reads the loader 603 into the memory 402 (step 503). Next, after the loader 603 itself loads the HYPERVISOR body 604 into the memory 402, HYPERVISOR is started (step 504). Next, HYPERVISOR creates tables required for control, generates respective tasks, and sets initial values to these tasks (step 505). After the initialization, HYPERVISOR starts the host LPAR task which displays an LPAR control screen 201 as shown in FIG. 2 (step 506).

It should be noted that HYPERVISOR resides on the memory 402, so that HYPERVISOR itself reserves a memory area for use thereby in a particular configuration during the initialization. Therefore, the capacity of memory available for each LPAR is that of the entire memory installed in the system except for the area used by HYPERVISOR.

Figure 7:
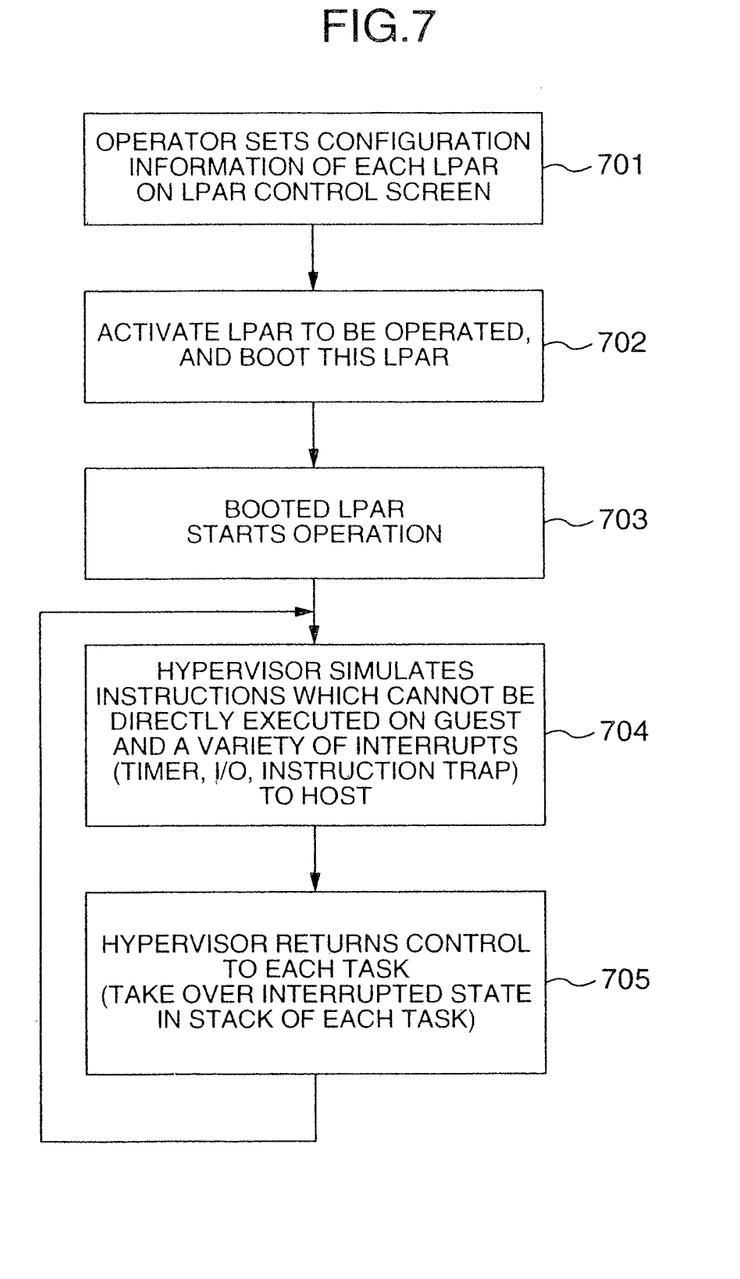
FIG. 7 is a flow diagram illustrating an operational processing flow of HYPERVISOR according to the embodiment of the present invention.

FIG. 7 illustrates a general operational flow of HYPERVISOR. The user sets configuration information for each LPAR on the LPAR control screen displayed by the host LPAR (the setting is not required when the configuration information has been already set) (step 701). LPAR intended for operation is set to ACTIVE on the LPAR control screen, and booted from the HDD 403 to the memory 402 (step 702). Then, the booted LPAR starts operating (step 703). HYPERVISOR simulates instructions which cannot be directly executed on a guest, and a variety of interrupts (timer, I/O, instruction trap, and the like) to the host (step 704). Then, HYPERVISOR returns the control to each task (step 705). Subsequently, HYPERVISOR repeats the processing at steps 704, 705.

Figure 8:
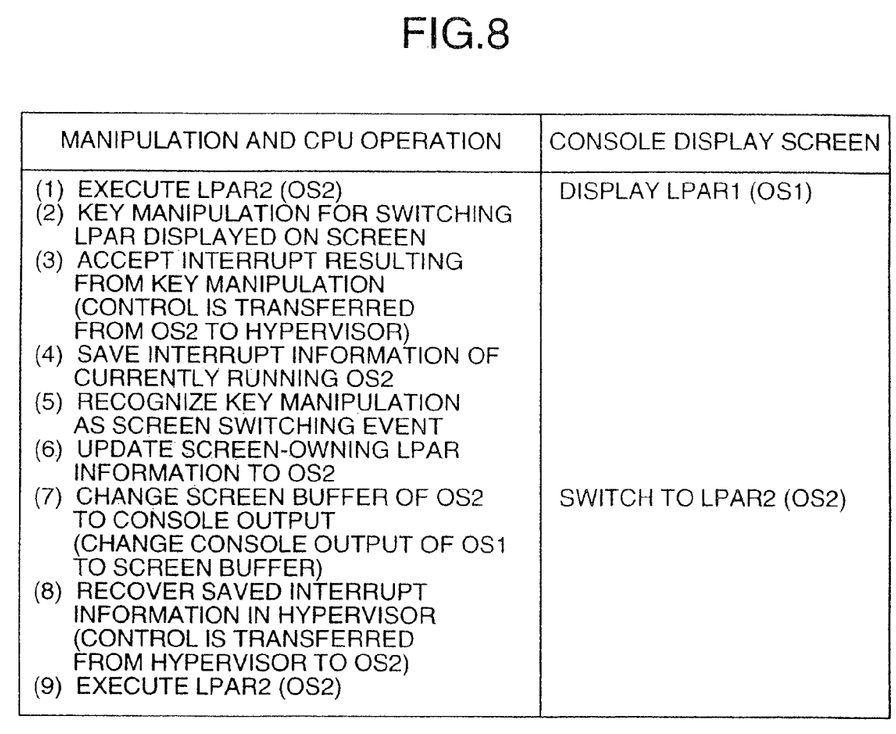
FIG. 8 is a table showing an operational procedure for switching a display screen.

FIG. 8 shows an operational procedure for switching a displayed screen. Specifically, FIG. 8 shows an operational procedure for switching a display on the console screen from LPAR1 to LPAR2. Here, OS1 is running on LPAR1 as the operating system, while OS2 is running on LPAR2.

During execution of LPAR2 (OS2) (1), as the user performs a key manipulation for switching a screen for LPAR1 to a screen for LPAR2 (2), an interrupt caused by the key manipulation is accepted to transfer the control from OS2 to HYPERVISOR (3). HYPERVISOR saves interrupt information on OS2 (4), recognizes the key manipulation as an instruction for switching to the LPAR2 screen (5), updates screen-owning LPAR information to LPAR2 (OS2) (6), and changes a screen buffer of LPAR2 to a console output and changes a console output of LPAR1 to a screen buffer (7). As a result, the display on the console screen switches to LPAR2. Next, HYPERVISOR recovers the interrupt information saved thereby, and transfers the control from itself to LPAR2 (OS2) (8) to resume the execution of LPAR2 (OS2) (9).

According to the present invention, a user interface function in a virtual machine system on a server or a PC can be provided only by applying software without using SVP or the like. In addition, the user interface function is implemented as single LPAR, thereby making it possible to perform the operation in a manner similar to the switching of the screen to another LPAR and therefore reduce complexity in the operation.

It should be further understood by those skilled in the art that the foregoing description has been made on embodiments of the invention and that various changes and modifications may be made in the invention without departing from the spirit of the invention and the scope of the appended claims.

What is claimed is:

1. A virtual machine system implemented on a physical machine, said virtual machine system comprising:
   a display device, a memory and a processor, said processor being configured to execute a plurality of programs stored in said memory, wherein a plurality of virtual machines are operable under control of a virtual machine control program operated on said processor,
   at least one user-defined virtual machine defined as a specific virtual machine for which configuration information comprising performance of said physical machine and allocation of resources is specified by a user without using a service processor; and
   a control virtual machine provided by the virtual machine system for displaying a control screen which allows the user to specify said configuration information on said display device,
   wherein said virtual machine control program executes a simulation of instructions limited to specific instructions which are unable to be directly executed by an operating system operating on said at least one user defined virtual machine.

2. A virtual machine control method for controlling a virtual machine system wherein a plurality of virtual machines are operable under control of a virtual machine control program on a physical machine having a display device, said method comprising the steps of:
   providing at least one user-defined virtual machine defined as a specific virtual machine for which configuration information comprising performance of said physical machine and allocation of resources is specified by a user without using a service processor;
   providing a control virtual machine for displaying a control screen which allows the user to specify said configuration information on said display device; and causing said virtual machine control program to execute a simulation of instructions limited to specific instructions which are unable to be directly executed by an operating system operating on said at least one user defined virtual machine.

\* \* \* \* \*